(12) United States Patent
Smathers et al.

(10) Patent No.: US 11,077,524 B2
(45) Date of Patent: Aug. 3, 2021

(54) ADDITIVE MANUFACTURING UTILIZING METALLIC WIRE

(71) Applicant: H.C. STARCK INC., Newton, MA (US)

(72) Inventors: David B. Smathers, Columbus, OH (US); Patrick Hogan, Somerville, MA (US); Michael Thomas Stawovy, Cleveland Heights, OH (US); Maria B. Winnicka, Euclid, OH (US); Gary A. Rozak, Akron, OH (US)

(73) Assignee: H.C. STARCK INC., Newton, MA (US)

( * ) Notice: Subject to any disclaimer, the term of this patent is extended or adjusted under 35 U.S.C. 154(b) by 693 days.

(21) Appl. No.: 15/416,254

(22) Filed: Jan. 26, 2017

(65) Prior Publication Data

US 2017/0209963 A1    Jul. 27, 2017

Related U.S. Application Data

(60) Provisional application No. 62/287,690, filed on Jan. 27, 2016.

(51) Int. Cl.
*B23K 28/02*   (2014.01)
*B23K 26/342*   (2014.01)
(Continued)

(52) U.S. Cl.
CPC .............. *B23K 26/342* (2015.10); *B21C 1/02* (2013.01); *B22F 1/0055* (2013.01); *B22F 3/02* (2013.01); *B22F 7/06* (2013.01); *B22F 10/20* (2021.01); *B23K 9/04* (2013.01); *B23K 15/0086* (2013.01); *B23K 15/0093* (2013.01); *B23K 26/0006* (2013.01); *B23K 35/0272* (2013.01); *B23K 35/32* (2013.01); *B23K 35/406* (2013.01); *B33Y 70/00* (2014.12); *C22C 27/02* (2013.01); *C22C 30/00* (2013.01); *B21C 1/003* (2013.01); *B21C 23/002* (2013.01); *B22F 1/0048* (2013.01); *B22F 5/12* (2013.01); *B22F 2301/20* (2013.01); *B22F 2998/10* (2013.01); *B33Y 10/00* (2014.12); *C23F 1/00* (2013.01); *Y02P 10/25* (2015.11)

(58) Field of Classification Search
CPC ....... B23K 26/342; B21C 1/02; B22F 3/1055; B33Y 70/00
See application file for complete search history.

(56) References Cited

U.S. PATENT DOCUMENTS

| 4,668,282 A | 5/1987 | Gilman et al. |
| 6,261,337 B1 | 7/2001 | Kumar |

(Continued)

FOREIGN PATENT DOCUMENTS

WO    2015167769    11/2015

OTHER PUBLICATIONS

International Search Report and Written Opinion for International Application No. PCT/US2017/015047, dated Jun. 19, 2017, 12 pages.

*Primary Examiner* — Ibrahime A Abraham
*Assistant Examiner* — Ahmad Abdel-Rahman
(74) *Attorney, Agent, or Firm* — Morgan, Lewis & Bockius LLP

(57) ABSTRACT

In various embodiments, additive manufacturing is utilized to fabricate three-dimensional metallic parts using metallic alloy wire as a feedstock material.

20 Claims, 9 Drawing Sheets

(51) Int. Cl.

| | |
|---|---|
| *G05B 19/4097* | (2006.01) |
| *B23K 9/04* | (2006.01) |
| *B23K 15/00* | (2006.01) |
| *B23K 26/00* | (2014.01) |
| *B23K 35/02* | (2006.01) |
| *B22F 1/00* | (2006.01) |
| *B22F 10/20* | (2021.01) |
| *B33Y 70/00* | (2020.01) |
| *B22F 3/02* | (2006.01) |
| *B22F 7/06* | (2006.01) |
| *B23K 35/32* | (2006.01) |
| *B23K 35/40* | (2006.01) |
| *C22C 30/00* | (2006.01) |
| *B21C 1/02* | (2006.01) |
| *C22C 27/02* | (2006.01) |
| *B21C 23/00* | (2006.01) |
| *B22F 5/12* | (2006.01) |
| *B33Y 10/00* | (2015.01) |
| *B21C 1/00* | (2006.01) |
| *C23F 1/00* | (2006.01) |

(56) References Cited

U.S. PATENT DOCUMENTS

| | | | |
|---|---|---|---|
| 6,603,090 B1 | 8/2003 | Schreiber et al. | |
| 2004/0182201 A1* | 9/2004 | Fuwa | B22F 1/0003 |
| | | | 75/252 |
| 2009/0074604 A1 | 3/2009 | Chen et al. | |
| 2012/0100390 A1* | 4/2012 | Kuroda | C22C 1/1036 |
| | | | 428/640 |
| 2013/0316183 A1* | 11/2013 | Kulkarni, Jr. | B23P 6/007 |
| | | | 428/557 |
| 2014/0056748 A1* | 2/2014 | Jensrud | B21C 23/08 |
| | | | 419/3 |
| 2014/0328710 A1 | 11/2014 | Cui et al. | |
| 2015/0114944 A1* | 4/2015 | Fukuda | C22C 19/057 |
| | | | 219/145.22 |
| 2016/0339517 A1* | 11/2016 | Joshi | B22F 1/025 |
| 2018/0326525 A1* | 11/2018 | Ann | B23K 9/044 |

* cited by examiner

ADDITIVE MANUFACTURING UTILIZING METALLIC WIRE

RELATED APPLICATION

This application claims the benefit of and priority to U.S. Provisional Patent Application No. 62/287,690, filed Jan. 27, 2016, the entire disclosure of which is hereby incorporated herein by reference.

TECHNICAL FIELD

In various embodiments, the present invention relates to the additive manufacturing of three-dimensional parts utilizing metallic wire.

BACKGROUND

High-entropy alloys (HEAs) are typically defined as alloys containing 5 or more constituent elements each with a concentration between 5 and 35 atomic %. The defining feature of HEAs over other complex alloys is that, due to their high entropy of mixing, they essentially consist of a simple solid solution phase, rather than forming one or more intermetallic phases. Various HEAs exhibit one or more superior mechanical properties such as yield strength, fracture toughness, and fatigue resistance. Multi-principal element alloys (MPEAs) are similar to HEAs but may include as few as four constituent elements. However, many HEAs and MPEAs, particularly those that include one or more refractory metals (e.g., Nb, Mo, etc.) are quite difficult to fabricate and utilize due to their high strength and limited ductility. Because diffusion tends to be quite slow in HEAs and MPEAs, bulk quantities of these materials are also often quite difficult to homogenize. These and similar issues have limited the widespread adoption of many HEAs and MPEAs.

Additive manufacturing, or three-dimensional (3D) printing, is a widely utilized technique for rapid manufacturing and rapid prototyping. In general, additive manufacturing entails the layer-by-layer deposition of material by computer control to form a three-dimensional object. Most additive manufacturing techniques to date have utilized polymeric or plastic materials as raw materials, as such materials are easily handled and melt at low temperatures. Since additive manufacturing involves the melting of only small amounts of material at a time, the process has the potential to be a useful technique for the fabrication of large, complex structures composed of HEAs or MPEAs. Specifically, the small melt pool of material utilized at any point in time during an additive manufacturing process may result in small molten volumes of substantially homogenous alloy material that cool at a rate sufficient to stabilize the homogenized composition of the alloy. That is, the small size of the melt pool should promote mixing of the alloy constituents, and the high cooling rate should limit segregation, promoting formation of a substantially homogeneous alloy.

Unfortunately, additive manufacturing of metallic materials is not without its challenges. When metallic precursor materials for additive manufacturing possess significant amounts of oxygen or other volatile species (e.g., calcium, sodium, antimony, phosphorous, sulfur, etc.), the melting of such materials may result in sparking, blistering, and splattering (i.e., ejection of small pieces of the materials themselves). In addition, even if a three-dimensional part is fabricated utilizing such materials, the part may exhibit excessive porosity, cracking, material splatter, and insufficient density and machinability.

In view of the foregoing, there is a need for improved precursor materials for the additive manufacturing of metallic parts, and in particular parts composed of HEAs and MPEAs.

SUMMARY

In accordance with various embodiments of the present invention, wires for use as feedstock for additive manufacturing processes of HEAs or MPEAs are fabricated from powders of the various constituent elements of the alloy. The powders are formed utilizing one or more techniques that minimize or substantially reduce the amount of oxygen and other volatile elements within the powders. In this manner, the amount of such volatile species within the wire is minimized or reduced. For example, various powders may be formed and/or treated via a hydride/dehydride process, plasma densification, and/or plasma atomization, and the powders may have low concentrations of volatile species such as oxygen (e.g., oxygen contents lower than 300 ppm, or even lower than 100 ppm). Various powders or powder precursors may even be combined with one or more materials (e.g., metals) having a higher affinity for oxygen (e.g., calcium, magnesium, etc.), deoxidized at high temperature, and then separated from the high-oxygen-affinity material via, e.g., chemical leaching, as detailed in U.S. Pat. No. 6,261,337, filed on Aug. 19, 1999 (the '337 patent), the entire disclosure of which is incorporated by reference herein.

In addition, various embodiments of the present invention feature HEA or MPEA feedstock wire fabricated using powders of the alloy's constituent elements (or binary or ternary mixtures or alloys thereof) that have different particle sizes and/or volumetric shapes (or morphologies) in order to minimize the amount of inter-particle space within the wire. Since such space may include or trap oxygen or other volatile species within the wire, minimization of the space typically results in the substantial reduction of such species within the wire. Such wire may subsequently be melted (via, e.g., application of an electron beam or a laser) to fabricate a three-dimensional part utilizing an additive-manufacturing technique. For example, in various embodiments of the present invention, tungsten and/or molybdenum powders are plasma densified and thus are composed of substantially spherical particles. Such powders are mixed with multiple other powders formed utilizing hydride/dehydride processes to form one or more HEAs or one or more MPEAs. As known in the art, hydride/dehydride processes involve the embrittlement of a metal via hydrogen introduction (thereby forming a hydride phase), followed by mechanical grinding (e.g., ball milling) and dehydrogenation (e.g., heating in a vacuum); the resulting particles tend to be highly angular and flake-like due to the grinding process. In various embodiments of the present invention, such non-spherical powder particles are mixed with substantially spherical plasma-densified particles of other constituent metals, thereby maximizing particle packing efficiency and minimizing the amount of trapped volatile species within the final wire.

In accordance with various embodiments of the invention, the HEA or MPEA feedstock wire is formed by, e.g., drawing and/or other mechanical deformation (e.g., swaging, pilgering, extrusion, etc.) of a preform that has the shape of, for example, a rod or a bar. The resulting wire may be utilized in an additive manufacturing process to form a three-dimensional part composed of the alloy of the wire. In exemplary embodiments, the wire is fed toward a movable platform, and the tip of the wire is melted by, e.g., an electron beam or a laser. The platform moves such that the molten wire traces out the pattern of a substantially two-dimensional slice of the final part; in this manner, the final part is fabricated in layer-by-layer fashion via melting and rapid solidification of the wire.

Wire in accordance with embodiments of the invention may also be utilized in a variety of different wire-fed welding applications (e.g., MIG welding, welding repair) in which an electric arc is struck between the wire and a workpiece, causing part of the wire to fuse with the workpiece.

Various embodiments of the invention fabricate and utilize HEAs including, consisting essentially of, or consisting of five or more elements such as five or more of Nb, Ta, Mo, W, Ti, Hf, V, Zr, Al, and/or Cr. Exemplary HEAs in accordance with embodiments of the invention include MoTaTiZrHf, MoTaNbTiZrHf, MoTaNbWTiV, NbTiHfZrCr, NbTiHfZrV, and NbTaMoWX, where X is one or more of V, Cr, Ti, Zr, Hf, and Al. Various embodiments of the invention fabricate and utilize multi-principal element alloys (MPEAs) that include, consist essentially of, or consist of four or more elements such as four or more of Nb, Ta, Mo, W, Ti, Hf, V, Zr, Al, and/or Cr. Unless otherwise indicated, references herein to HEAs and/or the fabrication and use of HEAs containing five or more elements also encompass and are applicable to MPEAs having four or more elements and their fabrication and use. For each alloy in accordance with embodiments of the invention, the various elemental constituents may be present within the alloy in equiatomic or substantially equiatomic proportions. In other embodiments, one or more, or even each, of the elemental constituents is present within the alloy at an atomic concentration between 5% and 35%. In various embodiments, two or more of the elemental constituents are present in the alloy at approximately equal concentrations, and those concentrations are different from that of one or more other elemental constituents in the alloy. For example, two of the elemental constituents may be present in the alloy at approximately 40% (atomic), while the other 20% of the alloy is composed of the two or more other constituents, which may or may not be present in concentrations that are approximately equal to each other.

As utilized herein, the term "substantially spherical" means spherical to within ±10%, and in some embodiments, ±5% in any direction—i.e., the eccentricity in any direction does not exceed 5% or 10%. As utilized herein, "non-spherical" means elongated with an aspect ratio of at least 2:1, acicular, having at least one flat surface (e.g., a flake with two opposed flat surfaces), having at least one corner or vertex, or polyhedral.

In an aspect, embodiments of the invention feature a method of fabricating a metallic wire. One or more first metal powders and one or more second metal powders are combined to form at least a portion of a preform. Each of the first metal powders includes, consists essentially of, or consists of substantially spherical particles. Each of the second metal powders includes, consists essentially of, or consists of non-spherical particles. The one or more first metal powders are mixed with the one or more second metal particles such that a composition of the preform is substantially homogenous along at least a portion of the length of the preform. The diameter (or other lateral dimension such as a width) of the preform is reduced via one or more mechanical deformation processes to form a metallic wire. The metallic wire includes, consists essentially of, or consists of a high-entropy alloy that includes, consists essentially of, or consists of five or more metallic elements. Each first metal powder includes, consists essentially of, or consists of at least one of the metallic elements. Each second metal powder includes, consists essentially of, or consists of at least one of the metallic elements.

Embodiments of the invention may include one or more of the following in any of a variety of combinations. The five or more metallic elements may include, consist essentially of, or consist of at least five of Nb, Ta, Mo, W, Ti, Hf, V, Zr, Al, or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The concentration of oxygen, carbon, calcium, sodium, antimony, phosphorous, sulfur, and/or nitrogen of at least one of the first metal powders and/or at least one of the second metal powders, and/or of the wire itself, may be 300 ppm or less, 200 ppm or less, 100 ppm or less, 50 ppm or less, 25 ppm or less, or 10 ppm or less. The one or more mechanical deformation processes may include, consist essentially of, or consist of drawing, pilgering, swaging, extrusion, and/or rolling.

The preform may include one or more metallic tubes surrounding the one or more first metal powders and the one or more second metal powders. Each metallic tube may include, consist essentially of, or consist of at least one of the metallic elements. The one or more first metal powders and the one or more second metal powders may be combined within one or more sacrificial tubes. One or more (or even all) of the sacrificial tubes may be removed before, during, and/or after the diameter (or other lateral dimension) of the preform is reduced. Removing one or more of the sacrificial tubes may include, consist essentially of, or consist of melting and/or etching (e.g., wet chemical (e.g., acid) etching and/or dry (e.g., plasma) etching).

At least one of the first metal powders may be provided by a process including, consisting essentially of, or consisting of (a) providing a plurality of metal particulates and/or metal wire, (b) feeding the metal particulates and/or wire into a plasma, thereby at least partially melting (and/or atomizing and/or breaking apart) the metal particulates and/or wire, and (c) cooling the at least partially melted metal particulates and/or wire portions to form substantially spherical particles. At least one of the second metal powders may be provided by a process including, consisting essentially of, or consisting of (a) hydrogenating metal to form a metal hydride, (b) mechanically grinding the metal hydride into a plurality of non-spherical particles, and (c) dehydrogenating the non-spherical metal hydride particles. An average particle size of at least one of the first metal powders may range from approximately 15 μm to approximately 45 μm. An average particle size of at least one of the second metal powders may be greater than approximately 50 μm. An average particle size of at least one of the second metal powders may range from approximately 50 μm to approximately 100 μm or approximately 200 μm. An average particle size of one or more (or even all) of the first metal powders may be smaller than an average particle size of one or more (or even all) of the second metal powders. Embodiments of the invention may include wires formed by one or more of the above methods.

The wire may be utilized in an additive manufacturing process to form a three-dimensional part in, e.g., layer-by-layer fashion. A tip of the wire may be translated relative to a platform (i.e., the wire may be translated, the platform may be translated, or both may be translated). During the relative translation, the tip of the wire may be melted using an energy source to form a molten bead including, consisting essentially of, or consisting of the five or more metallic elements. The bead may cool to form at least a portion of a layer of a three-dimensional part. These steps may be repeated one or more times to produce at least a portion of the three-dimensional part. The three-dimensional part may include, consist essentially of, or consist of the high-entropy alloy. Embodiments of the invention may include three-dimensional parts formed according to any of the above methods.

In another aspect, embodiments of the invention feature a method of fabricating a metallic wire or wire preform that includes, consists essentially of, or consists of a high-entropy alloy including, consisting essentially of, or consisting of five or more metallic elements. A metallic tube is provided. The metallic tube includes, consists essentially of, or consists of at least one of the metallic elements of the high-entropy alloy. One or more first metal powders and one or more second metal powders are combined within the metallic tube. Each of the first metal powders includes, consists essentially of, or consists of substantially spherical particles. Each of the second metal powders includes, consists essentially of, or consists of non-spherical particles. The one or more first metal powders are mixed with the one or more second metal particles such that a composition of the combined powders is substantially homogenous along at least a portion of the length of the metallic tube, thereby forming the metallic wire or wire preform. Each first metal powder includes, consists essentially of, or consists of at least one of the metallic elements of the high-entropy alloy. Each second metal powder includes, consists essentially of, or consists of at least one of the metallic elements of the high-entropy alloy.

Embodiments of the invention may include one or more of the following in any of a variety of combinations. The diameter (or other lateral dimension, e.g., width) of the metallic wire or wire preform may be reduced via one or more mechanical deformation processes. The one or more mechanical deformation processes may include, consist essentially of, or consist of drawing, pilgering, swaging, extrusion, and/or rolling. The five or more metallic elements may include, consist essentially of, or consist of at least five of Nb, Ta, Mo, W, Ti, Hf, V, Zr, Al, and/or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The concentration of oxygen, carbon, calcium, sodium, antimony, phosphorous, sulfur, and/or nitrogen of at least one of the first metal powders, and/or at least one of the second metal powders, and/or of the metallic tube, and/or of the wire or wire preform itself, may be 300 ppm or less, 200 ppm or less, 100 ppm or less, 50 ppm or less, 25 ppm or less, or 10 ppm or less. The metallic tube may include, consist essentially of, or consist of one of the metallic elements. The metallic tube may be an alloy tube including, consisting essentially of, or consisting of two or more of the metallic elements.

At least one of the first metal powders may be provided by a process including, consisting essentially of, or consisting of (a) providing a plurality of metal particulates and/or metal wire, (b) feeding the metal particulates and/or wire into a plasma, thereby at least partially melting (and/or atomizing and/or breaking apart) the metal particulates and/or wire, and (c) cooling the at least partially melted metal particulates and/or wire portions to form substantially spherical particles. At least one of the second metal powders may be provided by a process including, consisting essentially of, or consisting of (a) hydrogenating metal to form a metal hydride, (b) mechanically grinding the metal hydride into a plurality of non-spherical particles, and (c) dehydrogenating the non-spherical metal hydride particles. An average particle size of at least one of the first metal powders may range from approximately 15 µm to approximately 45 µm. An average particle size of at least one of the second metal powders may be greater than approximately 50 µm. An average particle size of at least one of the second metal powders may range from approximately 50 µm to approximately 100 µm or approximately 200 µm. An average particle size of one or more (or even all) of the first metal powders may be smaller than an average particle size of one or more (or even all) of the second metal powders. Embodiments of the invention may include wires or wire preforms formed by one or more of the above methods.

The wire may be utilized in an additive manufacturing process to form a three-dimensional part in, e.g., layer-by-layer fashion. A tip of the wire may be translated relative to a platform (i.e., the wire may be translated, the platform may be translated, or both may be translated). During the relative translation, the tip of the wire may be melted using an energy source to form a molten bead including, consisting essentially of, or consisting of the five or more metallic elements. The bead may cool to form at least a portion of a layer of a three-dimensional part. These steps may be repeated one or more times to produce at least a portion of the three-dimensional part. The three-dimensional part may include, consist essentially of, or consist of the high-entropy alloy. Embodiments of the invention may include three-dimensional parts formed according to any of the above methods.

In yet another aspect, embodiments of the invention feature a method of forming a three-dimensional part including, consisting essentially of, or consisting of a high entropy alloy by additive manufacturing. The high entropy alloy includes, consists essentially of, or consists of five or more metallic elements selected from the group consisting of Nb, Ta, Mo, W, Ti, Hf, V, Zr, Al, and Cr. In a step (a), a wire is provided. The wire includes, consists essentially of, or consists of a substantially homogenous assemblage of one or more first metal powders and one or more second metal powders. Each first metal powder includes, consists essentially of, or consists of one or more of the metallic elements. Each second metal powder includes, consists essentially of, or consists of one or more of the metallic elements. Particles of each first metal powder are substantially spherical. Particles of each second metal powder are non-spherical. In a step (b), a tip of the wire is translated relative to a platform (i.e., the wire may be translated, the platform may be translated, or both may be translated). In a step (c), during the relative translation, the tip of the wire is melted using an energy source to form a molten bead including, consisting essentially of, or consisting of the five or more metallic elements. The bead cools to form at least a portion of a layer of a three-dimensional part. Steps (b) and (c) may be repeated one or more times to produce at least a portion of the three-dimensional part. The three-dimensional part includes, consists essentially of, or consists of the high-entropy alloy.

Embodiments of the invention may include one or more of the following in any of a variety of combinations. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The wire may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or at least one metallic tube, and/or of the wire itself, may be 300 ppm or less, 200 ppm or less, 100 ppm or less, 50 ppm or less, 25 ppm or less, or 10 ppm or less. Embodiments of the invention may include three-dimensional parts formed according to any of the above methods.

In another aspect, embodiments of the invention feature a high-entropy-alloy wire or wire preform including, consisting essentially of, or consisting of five or more metallic elements. The wire or wire preform includes, consists essentially of, or consists of an assemblage of one or more first metal powders and one or more second metal powders. Each first metal powder includes, consists essentially of, or consists of one or more of the metallic elements. Each second metal powder includes, consists essentially of, or consists of one or more of the metallic elements. Particles of each first metal powder are substantially spherical. Particles of each second metal powder are non-spherical.

Embodiments of the invention may include one or more of the following in any of a variety of combinations. The five or more metallic elements may include, consist essentially of, or consist of at least five of Nb, Ta, Mo, W, Ti, Hf, V, Zr, Al, and/or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The wire or wire preform may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or of the metallic tube, and/or of the wire or wire preform itself, may be 300 ppm or less, 200 ppm or less, 100 ppm or less, 50 ppm or less, 25 ppm or less, or 10 ppm or less.

In an aspect, embodiments of the invention feature a method of fabricating a metallic wire. One or more first metal powders and one or more second metal powders are combined to form at least a portion of a preform. Each of the first metal powders includes, consists essentially of, or consists of substantially spherical particles. Each of the second metal powders includes, consists essentially of, or consists of non-spherical particles. The one or more first metal powders are mixed with the one or more second metal particles such that a composition of the preform is substantially homogenous along at least a portion of the length of the preform. The diameter (or other lateral dimension such as a width) of the preform is reduced via one or more mechanical deformation processes to form a metallic wire. The metallic wire includes, consists essentially of, or consists of (1) a high-entropy alloy that includes, consists essentially of, or consists of five or more metallic elements or (2) a multi-principal element alloy that includes, consists essentially of, or consists of four or more metallic elements. Each first metal powder includes, consists essentially of, or consists of at least one of the metallic elements. Each second metal powder includes, consists essentially of, or consists of at least one of the metallic elements.

Embodiments of the invention may include one or more of the following in any of a variety of combinations. The metallic elements may include, consist essentially of, or consist of at least four or at least five of Nb, Ta, Mo, W, Ti, Hf, V, Zr, Al, or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The concentration of oxygen, carbon, calcium, sodium, antimony, phosphorous, sulfur, and/or nitrogen of at least one of the first metal powders and/or at least one of the second metal powders, and/or of the wire itself, may be 300 ppm or less, 200 ppm or less, 100 ppm or less, 50 ppm or less, 25 ppm or less, or 10 ppm or less. The one or more mechanical deformation processes may include, consist essentially of, or consist of drawing, pilgering, swaging, extrusion, and/or rolling.

The preform may include one or more metallic tubes surrounding the one or more first metal powders and the one or more second metal powders. Each metallic tube may include, consist essentially of, or consist of at least one of the metallic elements. The one or more first metal powders and the one or more second metal powders may be combined within one or more sacrificial tubes. One or more (or even all) of the sacrificial tubes may be removed before, during, and/or after the diameter (or other lateral dimension) of the preform is reduced. Removing one or more of the sacrificial tubes may include, consist essentially of, or consist of melting and/or etching (e.g., wet chemical (e.g., acid) etching and/or dry (e.g., plasma) etching).

At least one of the first metal powders may be provided by a process including, consisting essentially of, or consisting of (a) providing a plurality of metal particulates and/or metal wire, (b) feeding the metal particulates and/or wire into a plasma, thereby at least partially melting (and/or atomizing and/or breaking apart) the metal particulates and/or wire, and (c) cooling the at least partially melted metal particulates and/or wire portions to form substantially spherical particles. At least one of the second metal powders may be provided by a process including, consisting essentially of, or consisting of (a) hydrogenating metal to form a metal hydride, (b) mechanically grinding the metal hydride into a plurality of non-spherical particles, and (c) dehydrogenating the non-spherical metal hydride particles. An average particle size of at least one of the first metal powders may range from approximately 15 μm to approximately 45 μm. An average particle size of at least one of the second metal powders may be greater than approximately 50 μm. An average particle size of at least one of the second metal powders may range from approximately 50 μm to approximately 100 μm or approximately 200 μm. An average particle size of one or more (or even all) of the first metal powders may be smaller than an average particle size of one or more (or even all) of the second metal powders. Embodiments of the invention may include wires formed by one or more of the above methods.

The wire may be utilized in an additive manufacturing process to form a three-dimensional part in, e.g., layer-by-layer fashion. A tip of the wire may be translated relative to a platform (i.e., the wire may be translated, the platform may be translated, or both may be translated). During the relative translation, the tip of the wire may be melted using an energy source to form a molten bead including, consisting essentially of, or consisting of the four or more metallic elements or the five or more metallic elements. The bead may cool to form at least a portion of a layer of a three-dimensional part. These steps may be repeated one or more times to produce at least a portion of the three-dimensional part. The three-dimensional part may include, consist essentially of, or consist of the high-entropy alloy or the multi-principal element alloy. Embodiments of the invention may include three-dimensional parts formed according to any of the above methods.

In another aspect, embodiments of the invention feature a method of fabricating a metallic wire or wire preform that includes, consists essentially of, or consists of (1) a high-entropy alloy including, consisting essentially of, or consisting of five or more metallic elements or (2) a multi-principal element alloy including, consisting essentially of, or consisting of four or more metallic elements. A metallic tube is provided. The metallic tube includes, consists essentially of, or consists of at least one of the metallic elements of the high-entropy alloy or the multi-principal element alloy. One or more first metal powders and one or more second metal powders are combined within the metallic tube. Each of the first metal powders includes, consists essentially of, or consists of substantially spherical particles. Each of the second metal powders includes, consists essentially of, or consists of non-spherical particles. The one or more first metal powders are mixed with the one or more second metal particles such that a composition of the combined powders is substantially homogeneous along at least a portion of the length of the metallic tube, thereby forming the metallic wire or wire preform. Each first metal powder includes, consists essentially of, or consists of at least one of the metallic elements of the high-entropy alloy or the multi-principal element alloy. Each second metal powder includes, consists essentially of, or consists of at least one of the metallic elements of the high-entropy alloy or the multi-principal element alloy.

Embodiments of the invention may include one or more of the following in any of a variety of combinations. The diameter (or other lateral dimension, e.g., width) of the metallic wire or wire preform may be reduced via one or more mechanical deformation processes. The one or more mechanical deformation processes may include, consist essentially of, or consist of drawing, pilgering, swaging, extrusion, and/or rolling. The metallic elements may include, consist essentially of, or consist of at least four of or at least five of Nb, Ta, Mo, W, Ti, Hf, V, Zr, Al, and/or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The concentration of oxygen, carbon, calcium, sodium, antimony, phosphorous, sulfur, and/or nitrogen of at least one of the first metal powders, and/or at least one of the second metal powders, and/or of the metallic tube, and/or of the wire itself, may be 300 ppm or less, 200 ppm or less, 100 ppm or less, 50 ppm or less, 25 ppm or less, or 10 ppm or less. The metallic tube may include, consist essentially of, or consist of one of the metallic elements. The metallic tube may be an alloy tube including, consisting essentially of, or consisting of two or more of the metallic elements.

At least one of the first metal powders may be provided by a process including, consisting essentially of, or consisting of (a) providing a plurality of metal particulates and/or metal wire, (b) feeding the metal particulates and/or wire into a plasma, thereby at least partially melting (and/or atomizing and/or breaking apart) the metal particulates and/or wire, and (c) cooling the at least partially melted metal particulates and/or wire portions to form substantially spherical particles. At least one of the second metal powders may be provided by a process including, consisting essentially of, or consisting of (a) hydrogenating metal to form a metal hydride, (b) mechanically grinding the metal hydride into a plurality of non-spherical particles, and (c) dehydrogenating the non-spherical metal hydride particles. An average particle size of at least one of the first metal powders may range from approximately 15 μm to approximately 45 μm. An average particle size of at least one of the second metal powders may be greater than approximately 50 μm. An average particle size of at least one of the second metal powders may range from approximately 50 μm to approximately 100 μm or approximately 200 μm. An average particle size of one or more (or even all) of the first metal powders may be smaller than an average particle size of one or more (or even all) of the second metal powders. Embodiments of the invention may include wires or wire preforms formed by one or more of the above methods.

The wire may be utilized in an additive manufacturing process to form a three-dimensional part in, e.g., layer-by-layer fashion. A tip of the wire may be translated relative to a platform (i.e., the wire may be translated, the platform may be translated, or both may be translated). During the relative translation, the tip of the wire may be melted using an energy source to form a molten bead including, consisting essentially of, or consisting of the four or more metallic elements or the five or more metallic elements. The bead may cool to form at least a portion of a layer of a three-dimensional part. These steps may be repeated one or more times to produce at least a portion of the three-dimensional part. The three-dimensional part may include, consist essentially of, or consist of the high-entropy alloy or the multi-principal element alloy. Embodiments of the invention may include three-dimensional parts formed according to any of the above methods.

In yet another aspect, embodiments of the invention feature a method of forming a three-dimensional part including, consisting essentially of, or consisting of a high-entropy alloy or a multi-principal element alloy by additive manufacturing. The high-entropy alloy includes, consists essentially of, or consists of five or more metallic elements selected from the group consisting of Nb, Ta, Mo, W, Ti, Hf, V, Zr, Al, and Cr. The multi-principal element alloy includes, consists essentially of, or consists of four or more metallic elements selected from the group consisting of Nb, Ta, Mo, W, Ti, Hf, V, Zr, Al, and Cr. In a step (a), a wire is provided. The wire includes, consists essentially of, or consists of a substantially homogenous assemblage of one or more first metal powders and one or more second metal powders. Each first metal powder includes, consists essentially of, or consists of one or more of the metallic elements. Each second metal powder includes, consists essentially of, or consists of one or more of the metallic elements. Particles of each first metal powder are substantially spherical. Particles of each second metal powder are non-spherical. In a step (b), a tip of the wire is translated relative to a platform (i.e., the wire may be translated, the platform may be translated, or both may be translated). In a step (c), during the relative translation, the tip of the wire is melted using an energy source to form a molten bead including, consisting essentially of, or consisting of the four or more metallic elements or the five or more metallic elements. The bead cools to form at least a portion of a layer of a three-dimensional part. Steps (b) and (c) may be repeated one or more times to produce at least a portion of the three-dimensional part. The three-dimensional part includes, consists essentially of, or consists of the high-entropy alloy or the multi-principal element alloy.

Embodiments of the invention may include one or more of the following in any of a variety of combinations. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The wire may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or at least one metallic tube, and/or the wire itself, may be 300 ppm or less, 200 ppm or less, 100 ppm or less, 50 ppm or less, 25 ppm or less, or 10 ppm or less. Embodiments of the invention may include three-dimensional parts formed according to any of the above methods.

In another aspect, embodiments of the invention feature a multi-principal element alloy wire or wire preform including, consisting essentially of, or consisting of four or more metallic elements. The wire or wire preform includes, consists essentially of, or consists of an assemblage of one or more first metal powders and one or more second metal powders. Each first metal powder includes, consists essentially of, or consists of one or more of the metallic elements. Each second metal powder includes, consists essentially of, or consists of one or more of the metallic elements. Particles of each first metal powder are substantially spherical. Particles of each second metal powder are non-spherical.

Embodiments of the invention may include one or more of the following in any of a variety of combinations. The four or more metallic elements may include, consist essentially of, or consist of at least four of Nb, Ta, Mo, W, Ti, Hf, V, Zr, Al, and/or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The wire may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or of the metallic tube, and/or of the wire or wire preform itself, may be 300 ppm or less, 200 ppm or less, 100 ppm or less, 50 ppm or less, 25 ppm or less, or 10 ppm or less.

In yet another aspect, embodiments of the invention feature a method of forming a three-dimensional part including, consisting essentially of, or consisting of a high-entropy alloy or a multi-principal element alloy by additive manufacturing. The high-entropy alloy includes, consists essentially of, or consists of five or more metallic elements selected from the group consisting of Nb, Ta, Mo, W, Ti, Hf, V, Zr, Al, and Cr. The multi-principal element alloy includes, consists essentially of, or consists of four or more metallic elements selected from the group consisting of Nb, Ta, Mo, W, Ti, Hf, V, Zr, Al, and Cr. In a step (a), a wire preform is provided. The wire preform includes, consists essentially of, or consists of a substantially homogenous assemblage of one or more first metal powders and one or more second metal powders. Each first metal powder includes, consists essentially of, or consists of one or more of the metallic elements. Each second metal powder includes, consists essentially of, or consists of one or more of the metallic elements. Particles of each first metal powder are substantially spherical. Particles of each second metal powder are non-spherical. In a step (b), a diameter (or other lateral dimension such as width) of the wire preform is reduced via one or more mechanical deformation processes, thereby forming a metallic wire. In a step (c), a tip of the wire is translated relative to a platform (i.e., the wire may be translated, the platform may be translated, or both may be translated). In a step (d), during the relative translation, the tip of the wire is melted using an energy source to form a molten bead including, consisting essentially of, or consisting of the four or more metallic elements or the five or more metallic elements. The bead cools to form at least a portion of a layer of a three-dimensional part. Steps (c) and (d) may be repeated one or more times to produce at least a portion of the three-dimensional part. The three-dimensional part includes, consists essentially of, or consists of the high-entropy alloy or the multi-principal element alloy.

Embodiments of the invention may include one or more of the following in any of a variety of combinations. The one or more mechanical deformation processes may include, consist essentially of, or consist of drawing, pilgering, swaging, extrusion, and/or rolling. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. At least some of the non-spherical particles of at least one second metal powder may be angular flakes. The wire preform may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or at least one metallic tube, and/or of the wire preform, and/or of the wire itself, may be 300 ppm or less, 200 ppm or less, 100 ppm or less, 50 ppm or less, 25 ppm or less, or 10 ppm or less. Embodiments of the invention may include three-dimensional parts formed according to any of the above methods.

In an aspect, embodiments of the invention feature a high-entropy-alloy wire including, consisting essentially of, or consisting of five or more metallic elements. The wire includes, consists essentially of, or consists of an assemblage of one or more first metal powders and one or more second metal powders. Each first metal powder includes, consists essentially of, or consists of one or more of the metallic elements. Each second metal powder includes, consists essentially of, or consists of one or more of the metallic elements. At least some particles of at least one first metal powder are substantially spherical. At least some particles of at least one second metal powder are elongated in the axial direction and extend at least partially around particles of the one or more first metal powders.

Embodiments of the invention may include one or more of the following in any of a variety of combinations. At least some of the particles of each of the first metal powders may be substantially spherical. At least some particles of at least one first metal powder may be elongated in the axial direction. At least some particles of each of the first metal powders may be elongated in the axial direction. Particles of at least one first metal powder may be less ductile than particles of at least one second metal powder. Particles of all of the first metal powders may be less ductile than particles of all of the second metal powders. The one or more first metal powders may include, consist essentially of, or consist of Mo and/or W. The one or more second metal powders may include, consist essentially of, or consist of Ta and/or Nb.

The five or more metallic elements may include, consist essentially of, or consist of at least five of Nb, Ta, Mo, W, Ti, Hf, V, Zr, Al, and/or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. The wire may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or of the metallic tube, and/or of the wire itself, may be 300 ppm or less, 200 ppm or less, 100 ppm or less, 50 ppm or less, 25 ppm or less, or 10 ppm or less.

In another aspect, embodiments of the invention feature a multi-principal element alloy wire or wire preform including, consisting essentially of, or consisting of four or more metallic elements. The wire includes, consists essentially of, or consists of an assemblage of one or more first metal powders and one or more second metal powders. Each first metal powder includes, consists essentially of, or consists of one or more of the metallic elements. Each second metal powder includes, consists essentially of, or consists of one or more of the metallic elements. At least some particles of at least one first metal powder are substantially spherical. At least some particles of at least one second metal powder are elongated in the axial direction and extend at least partially around particles of the one or more first metal powders.

Embodiments of the invention may include one or more of the following in any of a variety of combinations. At least some of the particles of each of the first metal powders may be substantially spherical. At least some particles of at least one first metal powder may be elongated in the axial direction. At least some particles of each of the first metal powders may be elongated in the axial direction. Particles of at least one first metal powder may be less ductile than particles of at least one second metal powder. Particles of all of the first metal powders may be less ductile than particles of all of the second metal powders. The one or more first metal powders may include, consist essentially of, or consist of Mo and/or W. The one or more second metal powders may include, consist essentially of, or consist of Ta and/or Nb.

The four or more metallic elements may include, consist essentially of, or consist of at least four of Nb, Ta, Mo, W, Ti, Hf, V, Zr, Al, and/or Cr. At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. The wire may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or of the metallic tube, and/or of the wire itself, may be 300 ppm or less, 200 ppm or less, 100 ppm or less, 50 ppm or less, 25 ppm or less, or 10 ppm or less.

In yet another aspect, embodiments of the invention feature a method of forming a three-dimensional part including, consisting essentially of, or consisting of a high-entropy alloy or a multi-principal element alloy by additive manufacturing. The high-entropy alloy includes, consists essentially of, or consists of five or more metallic elements selected from the group consisting of Nb, Ta, Mo, W, Ti, Hf, V, Zr, Al, and Cr. The multi-principal element alloy includes, consists essentially of, or consists of four or more metallic elements selected from the group consisting of Nb, Ta, Mo, W, Ti, Hf, V, Zr, Al, and Cr. In a step (a), a wire that extends in an axial direction is provided. The wire includes, consists essentially of, or consists of a substantially homogenous assemblage of one or more first metal powders and one or more second metal powders. Each first metal powder includes, consists essentially of, or consists of one or more of the metallic elements. Each second metal powder includes, consists essentially of, or consists of one or more of the metallic elements. At least some particles of at least one first metal powder are substantially spherical. At least some particles of at least one second metal powder are elongated in the axial direction and extend at least partially around particles of at least one of the first metal powders. In a step (b), a tip of the wire is translated relative to a platform (i.e., the wire may be translated, the platform may be translated, or both may be translated). In a step (c), during the relative translation, the tip of the wire is melted using an energy source to form a molten bead including, consisting essentially of, or consisting of the four or more metallic elements or the five or more metallic elements. The bead cools to form at least a portion of a layer of a three-dimensional part. Steps (b) and (c) may be repeated one or more times to produce at least a portion of the three-dimensional part. The three-dimensional part includes, consists essentially of, or consists of the high-entropy alloy or the multi-principal element alloy.

Embodiments of the invention may include one or more of the following in any of a variety of combinations. At least some of the particles of each of the first metal powders may be substantially spherical. At least some particles of at least one first metal powder may be elongated in the axial direction. At least some particles of each of the first metal powders may be elongated in the axial direction. Particles of at least one first metal powder may be less ductile than particles of at least one second metal powder. Particles of all of the first metal powders may be less ductile than particles of all of the second metal powders. The one or more first metal powders may include, consist essentially of, or consist of Mo and/or W. The one or more second metal powders may include, consist essentially of, or consist of Ta and/or Nb.

At least one first metal powder may be an elemental powder including, consisting essentially of, or consisting of one of the metallic elements. At least one first metal powder may be an alloy powder including, consisting essentially of, or consisting of two or more of the metallic elements. At least one second metal powder may be an elemental powder including, consisting essentially of, or consisting of one of the metallic elements. At least one second metal powder may be an alloy powder including, consisting essentially of, or consisting of two or more of the metallic elements. The wire may include one or more metallic tubes surrounding the one or more first metal powders and the one or more second metal powders. Each metallic tube may include, consist essentially of, or consist of at least one of the metallic elements. The concentration of oxygen, carbon, calcium, sodium, antimony, phosphorous, sulfur, and/or nitrogen of at least one of the first metal powders, and/or at least one of the second metal powders, and/or at least one metallic tube, and/or of the wire itself, may be 300 ppm or less, 200 ppm or less, 100 ppm or less, 50 ppm or less, 25 ppm or less, or 10 ppm or less. Embodiments of the invention may include three-dimensional parts formed according to any of the above methods.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function. As used herein, "consisting essentially of at least one metal" refers to a metal or a mixture of two or more metals but not compounds between a metal and a non-metallic element or chemical species such as oxygen, silicon, or nitrogen (e.g., metal nitrides, metal silicides, or metal oxides); such non-metallic elements or chemical species may be present, collectively or individually, in trace amounts, e.g., as impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

In various embodiments of the present invention, a preform in the shape of, e.g., a rod or a bar, is provided by pressing and/or sintering a collection of powders. Collectively, the powders contain all of the elements of a desired HEA or MPEA. For example, one or more, or even all, of the powders may each be composed of particles that include, consist essentially of, or consist of one of the alloy's constituent elements. In other embodiments, one or more of the powders may each be composed of agglomerate particles including, consisting essentially of, or consisting of a mixture or alloy of two or more of the alloy's constituent elements.

Figure 1:
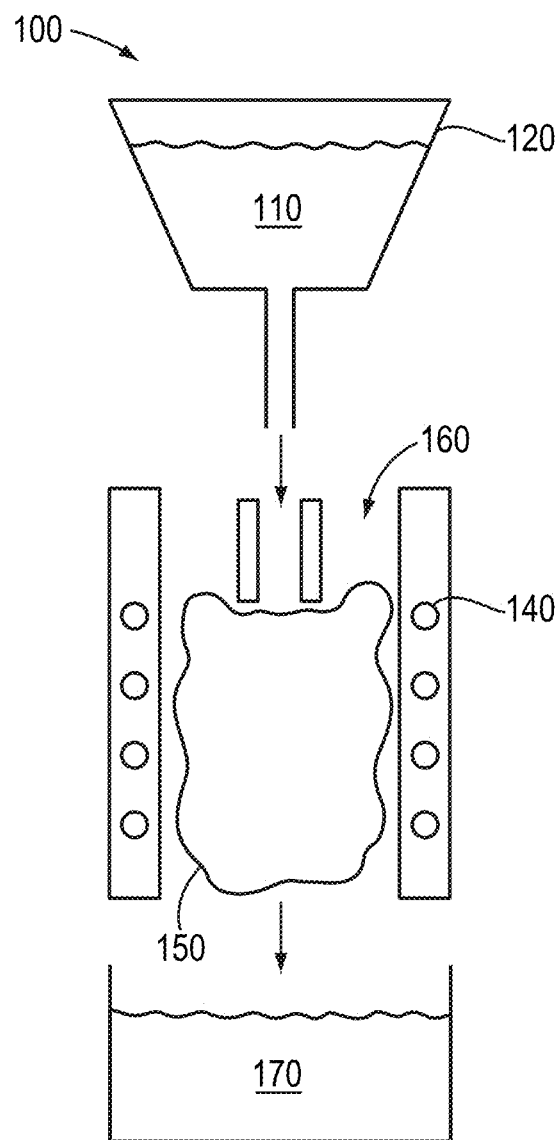
FIG. 1 is a schematic cross-sectional view of a plasma densification apparatus utilized to form spherical powder particles in accordance with various embodiments of the invention.

In accordance with various embodiments of the invention, the preform contains one or more powders composed of substantially spherical particles and one or more powders composed of non-spherical (e.g., flaky, angular, irregular, etc.) particles. For example, powder particles of tungsten and/or molybdenum (e.g., particles initially fabricated via a hydride/dehydride process or other process) may be plasma densified and may therefore be substantially spherical. An exemplary apparatus 100 for plasma densification is shown schematically in FIG. 1. As shown, powder particles 110 may be loaded into a powder feeder 120, which feeds the particles 110 through a plasma jet 130 formed by, for example, a time-varying current applied to an induction coil 140 sparking a plasma 150 from plasma gas 160 fed into the coil 140. The plasma jet 130 at least partially melts the particles 110, which subsequently resolidify into higher-density particles 170 collected below the plasma 150. The plasma-densified particles 170 are generally substantially spherical due to the plasma-induced melting and minimization of surface area resulting during resolidification. The minimization of the surface area of the particles also minimizes or substantially reduces the uptake of oxygen or other volatile species, and the plasma densification process itself volatilizes such species as well, thereby reducing the concentration of such contaminants within the powder 170. The plasma-densified powder particles 170 may have an average particle size of, for example, 15 µm to 45 µm, or even smaller.

Figure 2A:
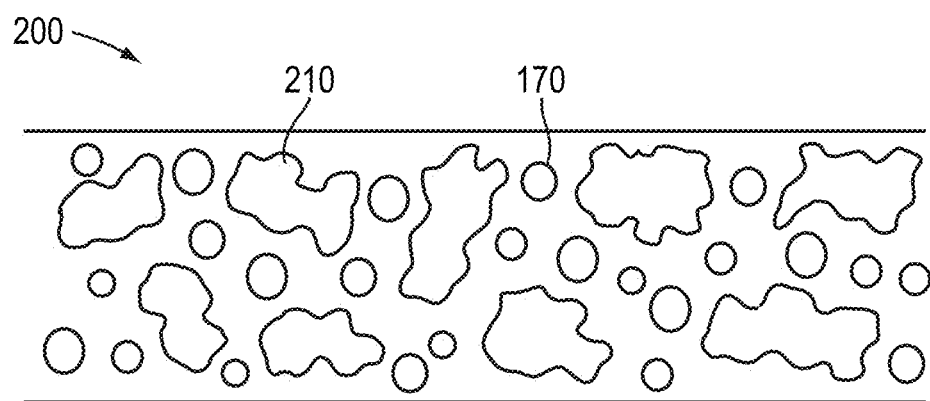
FIG. 2A is a schematic cross-section of a wire preform in accordance with various embodiments of the invention.

FIG. 2A depicts the fabrication of a wire preform 200 in accordance with embodiments of the present invention. One or more types of substantially spherical powder particles 170 are mixed with one or more powders of non-spherical particles 210 (e.g., within a tube 220 or in a cylindrical mold) such that all of the elements of the desired alloy are included within the preform 200. The non-spherical powder particles 210 may be formed by, e.g., a hydride/dehydride process. In various embodiments of the invention, the non-spherical powder particles are not rounded, oblong, ellipsoidal, and/or do not have smooth rounded surfaces along any portion of their surface areas. The non-spherical powder particles 210 may have an average particle size of, for example, less than or equal to 50 µm to 250 µm, or even larger. As mentioned above, either or both of the substantially spherical particles 170 or the non-spherical powder particles 210 may be individually composed of an alloy or mixture of two or more of the elements of the desired alloy. Such alloy powders may be formed via, e.g., hydride/dehydride of pre-alloyed ingots and optional plasma densification of powders resulting therefrom.

In various embodiments, the melting point of one or more of the types of substantially spherical particles 170 is higher than the melting point of one or more of the types of non-spherical particles 210. In various embodiments, the ductility of one or more of the types of substantially spherical particles 170 is lower than the ductility of one or more of the types of non-spherical particles 210. In various embodiments, none of the metallic elements within the substantially spherical particles 170 are present within the non-spherical particles 210 and vice versa. In various embodiments, one or more of the metallic elements of the desired HEA are represented in both the substantially spherical particles 170 and the non-spherical particles 210. In some embodiments, both the substantially spherical particles 170 and the non-spherical particles 210 contain all of the metallic elements of the desired alloy, as elemental powder particles and/or alloy powder particles.

Figure 2B:
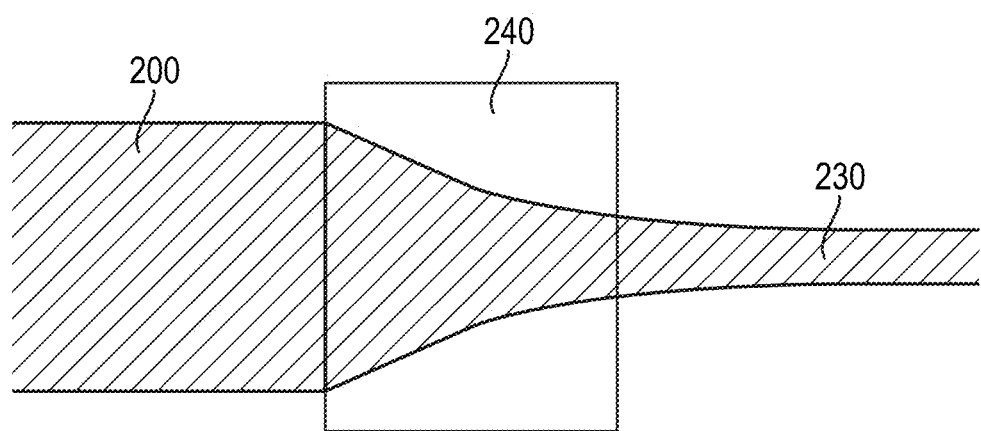
FIG. 2B is a schematic view of a wire being fabricated from a wire preform in accordance with various embodiments of the invention.

The resulting mixture of substantially spherical particles 170 and non-spherical powder particles 210 within the preform 200 advantageously reduces or minimizes the amount of empty void space within the preform 200. The particles 170, 210 are preferably distributed within the preform 200 such that the composition of the preform 200 is substantially homogeneous along its length. In various embodiments, the preform 200 and/or at least a portion of the powder mixture therein may be further densified before further processing into wire. For example, the preform 200 and/or the powder mixture may be pressed by, e.g., hot isostatic pressing or cold isostatic pressing. The powder or the preform may be densified before and/or after inclusion of a sacrificial tube (as detailed below). After formation of the preform 200, the preform 200 is processed into a wire 230. In an exemplary embodiment depicted in FIG. 2B, the preform 200 is formed into wire 230 via drawing through one or more drawing dies 240 until the diameter of the wire 230 is reduced to the desired dimension. In various embodiments, various types of the particles of the preform 200, particularly those having relatively low ductility (e.g., molybdenum, tungsten, etc.) may have their morphologies deform during the processing of the preform 200 into wire 230. For example, substantially spherical particles 170 of molybdenum and/or tungsten may be elongated into oblong shapes or ribbons (e.g., along the wire axis), and/or they may remain substantially spherical in the final wire 230. Other types of particles having higher ductility (e.g., tantalum, niobium, etc.) may elongate around the other particles and form a matrix disposed around the harder particles in the final wire. In various embodiments, the drawing is supplemented with or replaced by one or more other mechanical deformation processes that reduce the diameter (or other lateral dimension) of the preform 200, e.g., pilgering, rolling, swaging, extrusion, etc. The preform 200 and/or wire 230 may be annealed during and/or after diameter reduction (e.g., drawing).

Figure 2C:
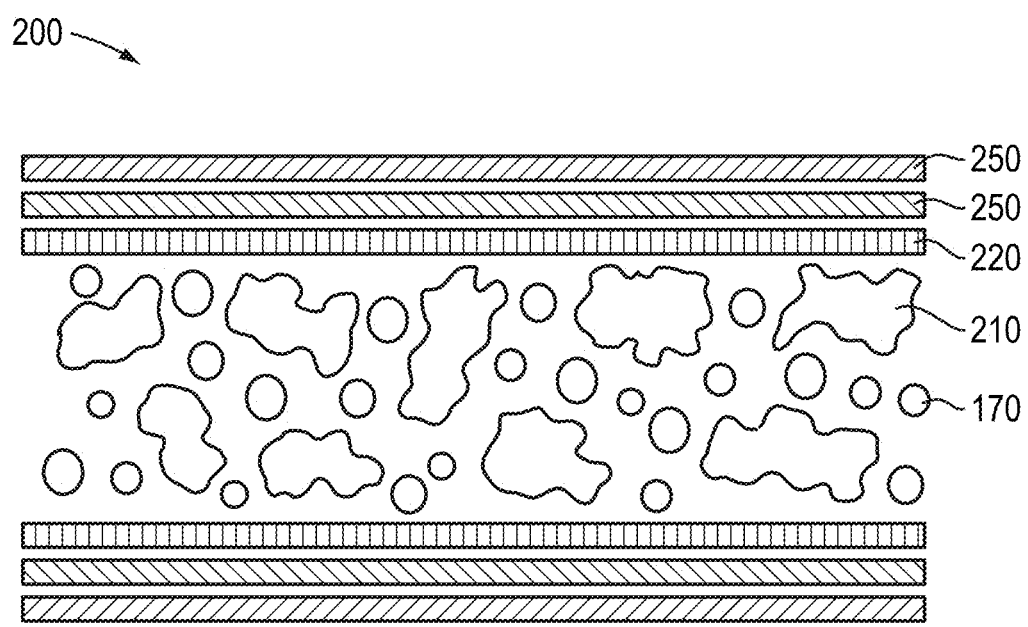
FIG. 2C is a schematic cross-section of a wire preform containing multiple coaxial tubes in accordance with various embodiments of the invention.

In various embodiments, the preform 200 is formed via the combination of one or more substantially spherical powders 170 with one or more non-spherical powders 210 within a tube 220 that includes, consists essentially of, or consists of one or more of the elements of the desired HEA or MPEA. The tube 220 may itself be coaxially disposed within one or more other tubes 250 that include, consist essentially of, or consist of one or more other elements of the HEA, as shown in FIG. 2C. In such embodiments, the powders disposed within the tubes need not include the elements represented within the tube(s). When the preform 200 containing the one or more tubes is drawn down into wire 230, the cross-section of the wire 230 will thus include all of the elemental constituents of the desired alloy. In various embodiments, at least a portion of the powder mixture may be further densified before being placed into tube 220. For example, the powder mixture may be pressed by, e.g., hot isostatic pressing or cold isostatic pressing.

In various embodiments, the one or more tubes may include, consist essentially of, or consist of one or more elements that are more ductile than one or more of the elements present in powder form. For example, the one or more tubes may include, consist essentially of, or consist of Nb, Ta, Ti, and/or Zr. In various embodiments, the one or more tubes have a sufficiently small diameter that the preform 200 itself may be utilized as the final wire 230 without further processing or diameter reduction such as wire drawing. In various embodiments, the one or more tubes, with the powders therewithin, may be annealed and/or subjected to pressure (e.g., hot-isostatically pressed) before (or between multiple steps of) the process of diameter reduction. Such treatment may advantageously reduce void space within and increase the density of the final wire 230.

In various embodiments, the melting point of one or more of the types of substantially spherical particles 170 and/or one or more of the types of non-spherical particles 210 is higher than the melting point of one or more of the metallic elements of one or more of the tubes 220, 250. In various embodiments, the ductility of one or more of the types of substantially spherical particles 170 and/or one or more of the types of non-spherical particles 210 is lower than the ductility of one or more of the metallic elements of one or more of the tubes 220, 250. In various embodiments, none of the metallic elements within the substantially spherical particles 170 and/or the non-spherical particles 210 are present within the tubes 220, 250 and vice versa. In various embodiments, one or more of the metallic elements of the desired alloy are represented in at least one of the types of substantially spherical particles 170 and/or at least one of the types of non-spherical particles 210, as well as in one or more of the tubes 220, 250.

In other embodiments, the preform 200 may include, consist essentially of, or consist of a sacrificial tube 220 in which the various powders 170, 210 are disposed. After processing of the preform 200 into wire 230, the sacrificial tube 220 may be etched or melted away, and the final wire 230 includes, consists essentially of, or consists of the elements of the desired alloy arising solely from the original powders 170, 210. In various embodiments, one or more tubes to be processed as part of the wire may be disposed within the sacrificial tube 220; at least portions of such tubes will typically remain as portions of the wire after removal of the sacrificial tube 220. The sacrificial tube 220 may include, consist essentially of, or consist of, for example, plastic, rubber, one or more polymeric materials, a metallic material having a melting point lower than one or more (or even all) of the metallic elements within the powders 170, 210, a metallic material selectively etchable (i.e., over the metallic elements within the powders 170, 210 and other tubes), etc.

Figure 3:
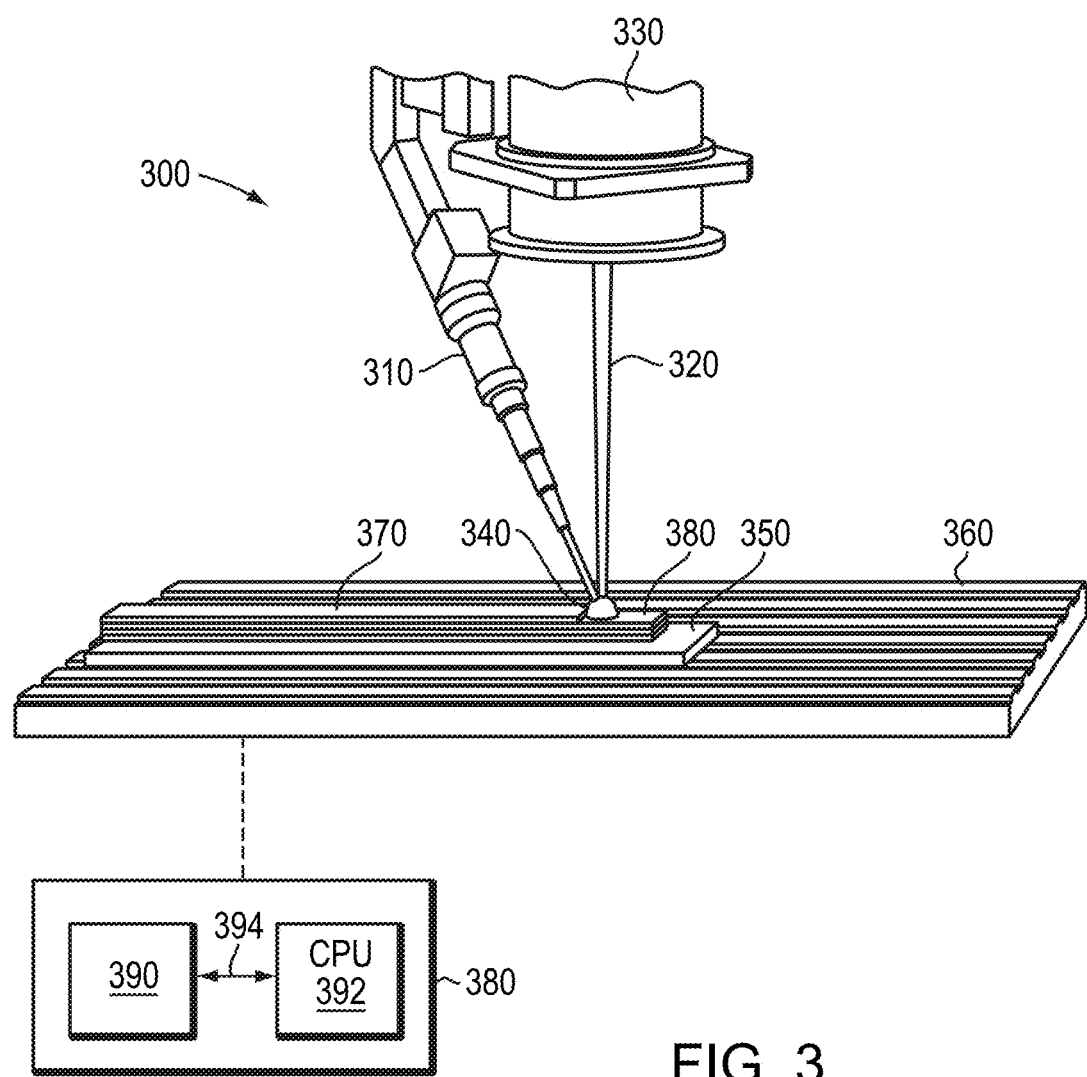
FIG. 3 is a schematic of an additive-manufacturing apparatus utilized to fabricate three-dimensional metallic parts in accordance with various embodiments of the invention.

Once wire 230 including, consisting essentially of, or consisting of the elemental constituents of a desired HEA or MPEA is fabricated in accordance with embodiments of the invention, the wire 230 may be utilized to fabricate a three-dimensional part with an additive manufacturing assembly 300. For example, as shown in FIG. 3, the wire 230 may be incrementally fed, using a wire feeder 310, into the path of a high-energy source 320 (e.g., an electron beam or a laser beam emitted by a laser or electron-beam source 330), which melts the tip of the wire 230 to form a small molten pool (or "bead" or "puddle") 340. The entire assembly 300 may be disposed within a vacuum chamber to prevent or substantially reduce contamination from the ambient environment.

Relative movement between a substrate 350 (which may be, as shown, disposed on a platform 360) supporting the deposit and the wire/gun assembly results in the part being fabricated in a layer-by-layer fashion. Such relative motion results in the continuous formation of a layer 370 of the three-dimensional object from continuous formation of molten pool 340 at the tip of the wire 230. As shown in FIG. 3, all or a portion of layer 370 may be formed over one or more previously formed layers 380. The relative movement (i.e., movement of the platform 360, the wire/gun assembly, or both) may be controlled by a computer-based controller 380 based on electronically stored representations of the part to be fabricated. For example, the two-dimensional layers traced out by the melting wire may be extracted from a stored three-dimensional representation of the final part stored in a memory 390.

The computer-based control system (or "controller") 380 in accordance with embodiments of the present invention may include or consist essentially of a general-purpose computing device in the form of a computer including a processing unit (or "computer processor") 392, the system memory 390, and a system bus 394 that couples various system components including the system memory 390 to the processing unit 392. Computers typically include a variety of computer-readable media that can form part of the system memory 390 and be read by the processing unit 392. By way of example, and not limitation, computer readable media may include computer storage media and/or communication media. The system memory 390 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 392. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described herein. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 392 that executes commands and instructions may be a general-purpose computer processor, but may utilize any of a wide variety of other technologies including special-purpose hardware, a microcomputer, minicomputer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

Advantageously, wires in accordance with embodiments of the invention are substantially homogeneous in composition. Thus, all of the elements of the desired HEA or MPEA are present in each small molten pool 340 of material at any particular instant during fabrication. Due to their small size, the pools 340 cool quickly, locking in the desired alloy composition. In addition, since empty void space within the wire 230 fabricated in accordance with embodiments of the present invention was substantially eliminated via packing of powder particles with multiple different shapes and/or sizes, the wire 230 melts during additive manufacturing with little if any sparking and without introducing porosity, cracks, or other defects into the printed part. After the additive manufacturing process is complete, the part may be removed from the platform and subjected to final machining and/or polishing.

EXAMPLE

A substantially pure Cu tube having a 0.648 inch outer diameter and a 0.524 inch inner diameter was wrapped around a Ta-3 W (i.e., Ta—W alloy containing approximately 3% W) welded tube having an outer diameter of 0.500 inch and an inner diameter of 0.470 inch. A powder blend of 4 weight percent Ta non-spherical powder particles, 32 weight percent Nb non-spherical powder particles, 32 weight percent Mo substantially spherical powder particles, and 32 weight percent W substantially spherical powder particles was utilized to fill the Ta-3 W tube at an apparent fill density of approximately 51%. The Ta and Nb powder particles were low-oxygen powder particles formed by a hydride-dehydride process and thus had the form of angular flakes. The Mo and W powder particles were formed via a plasma densification process. Taking into account the Ta-3 W tube, the preform within the Cu tube contained 24.3 atomic percent Ta, 25.7 atomic percent W, 25.0 atomic percent Mo, and 25.0 atomic percent Nb. In total, 390 grams of powder were utilized.

Figure 4A:
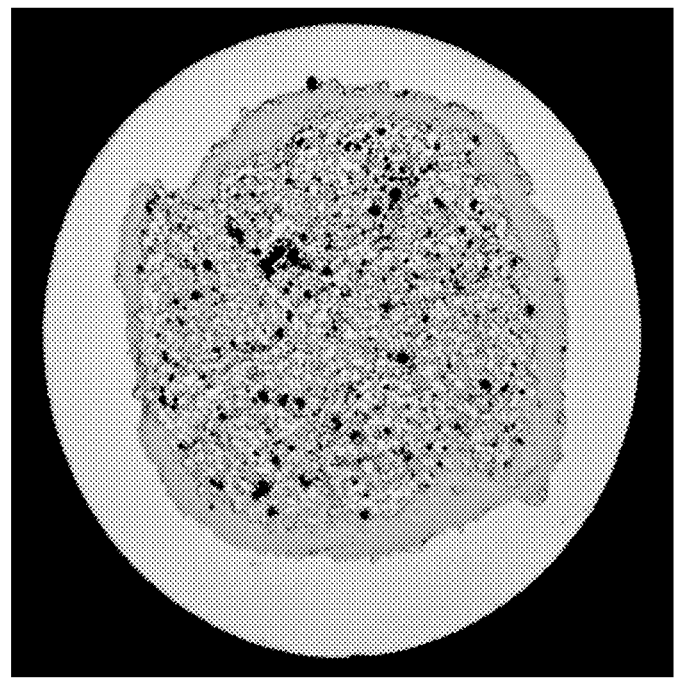
FIG. 4A is an axial cross-section of a wire fabricated in accordance with various embodiments of the invention.
Figure 4B:
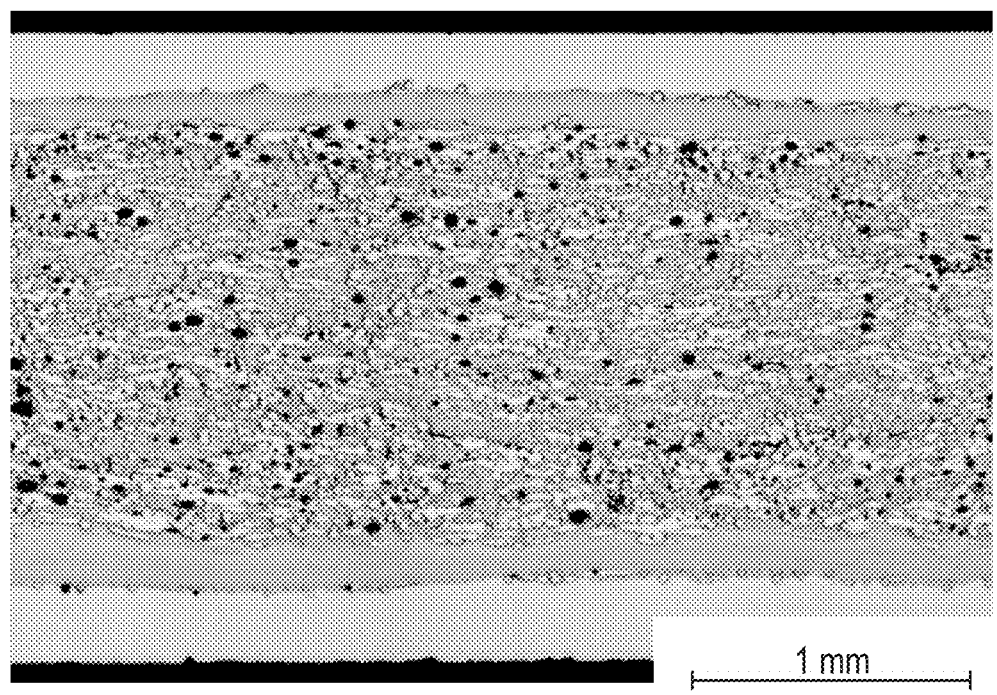
FIG. 4B is a longitudinal cross-section of the wire of FIG. 4A.

The ends of the Cu tube were sealed with Cu plugs, and the assembly was cold swaged to 0.069 inch diameter in about 20 steps ranging from 5% to 25% area reduction per pass, depending upon the available swage diameter for each pass. To minimize powder slip within the tube, the rod was swaged along one-half of its length, flipped, and then swaged from the opposite end until the whole assembly had a substantially uniform diameter. Including the Cu tube and plugs, the starting weight was about 935 grams, and the assembly produced more than 600 linear inches of wire (approximately 100:1 total area reduction). FIGS. 4A and 4B are, respectively, axial and longitudinal cross-sectional micrographs of the wire at a diameter of 0.084 inch. As shown, some of the initially substantially spherical powder particles remain substantially spherical, while others have elongated along the long axis of the wire due to the mechanical deformation. In general, the softer Ta and Nb powder particles have elongated around the harder Mo and W powder particles.

The Cu-sheathed wire was continuous and could be coiled to a diameter of 13 inches without breaking. The Cu sheath was removed prior to testing. For testing, lengths of the wire each having a length of 3 inches were cut and acid etched in a mixture of 25% nitric acid and 75% distilled water until all of the Cu was removed. In order to simulate the high-speed melting and resolidification of an additive manufacturing process, wire sections totaling 32 grams in weight were placed in a cold Cu hearth, and an electric arc from a W electrode supplied sufficient energy to melt the wire. The Cu hearth rapidly cooled the metal, thereby closely approximating the high rate of cooling in additive manufacturing. A second set of samples included sufficient pure V added to the hearth to produce a 20%-20%-20%-20%-20% (atomic percent) HEA of V—Nb—Ta—Mo—W. This second set of samples could also have been produced via inclusion of the proper amount of substantially spherical or non-spherical V powder particles within the starting Ta-3 W tube. All of the samples produced in accordance with this example melted readily into a substantially homogenous mixture of their constituent elements and resolidified as a single solid solution phase. Moreover, all of the samples melted very gently and quietly (i.e., with minimal or no splattering, spitting, etc.), despite their origins as powder blends; thus, embodiments of the present invention have sufficiently high density and sufficiently low concentrations of volatile contaminants to ensure compatibility with additive manufacturing, welding, and other rapid melting and solidification processes.

Figure 5:
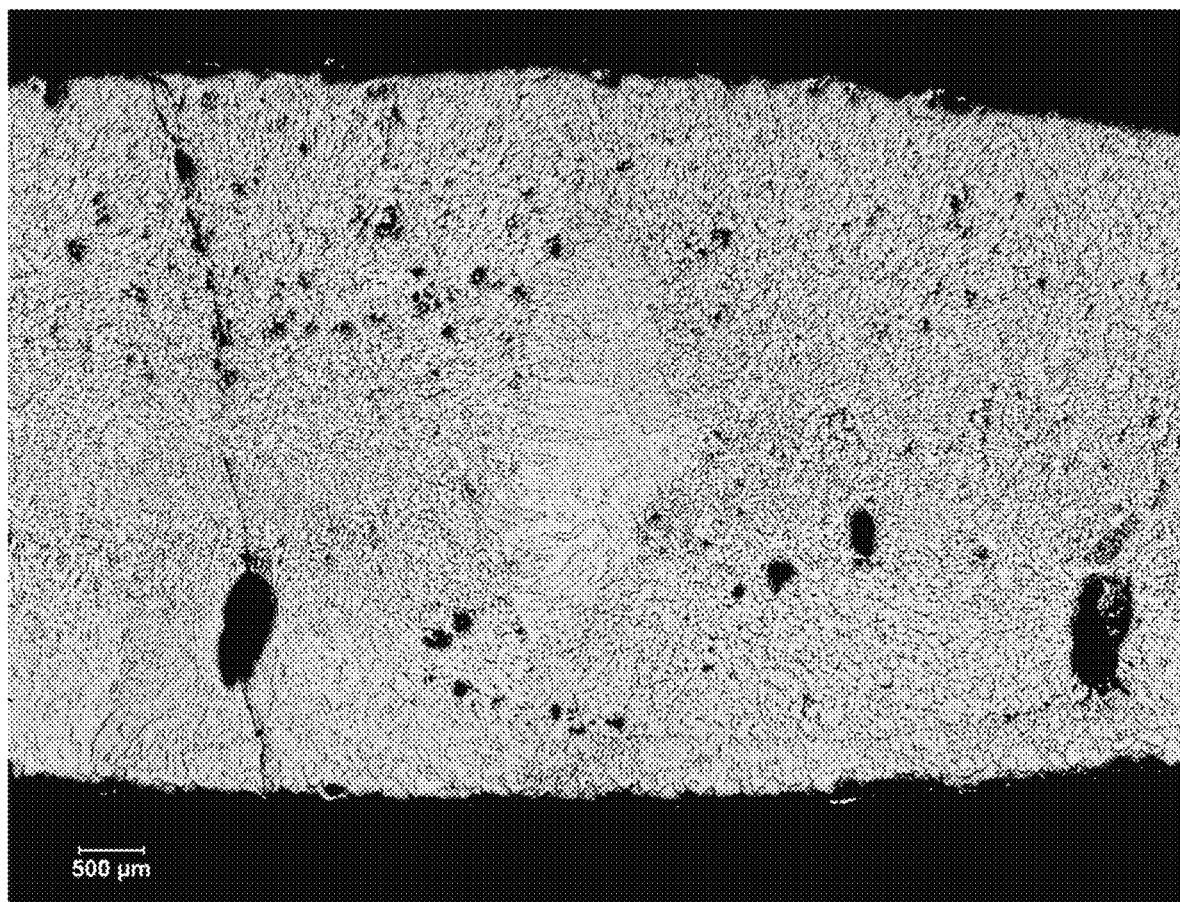
FIG. 5 is a cross-sectional micrograph of a melted and resolidified multi-principal element alloy wire fabricated in accordance with various embodiments of the invention.
Figure 6:
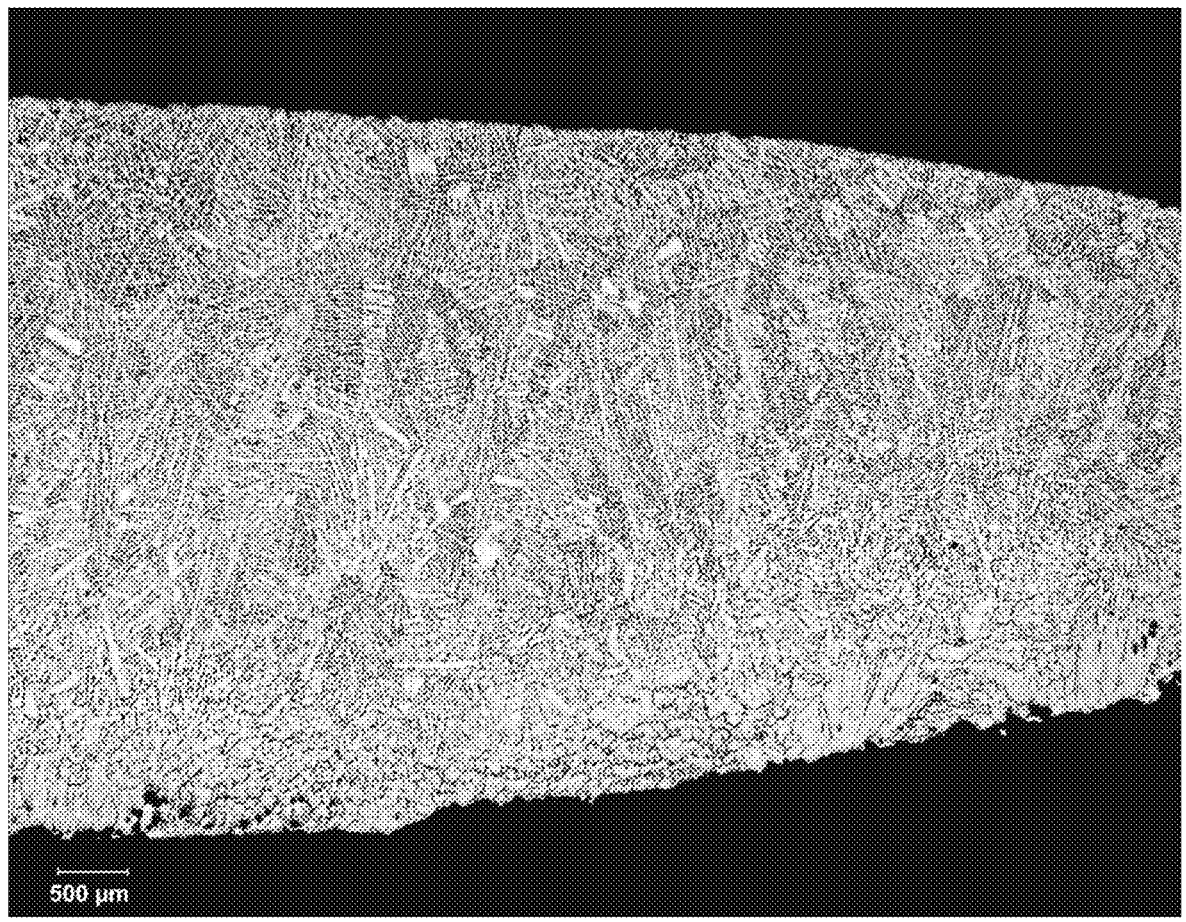
FIGS. 6 and 7 are cross-sectional micrographs of a melted and resolidified high-entropy alloy fabricated in accordance with various embodiments of the invention.
Figure 7:
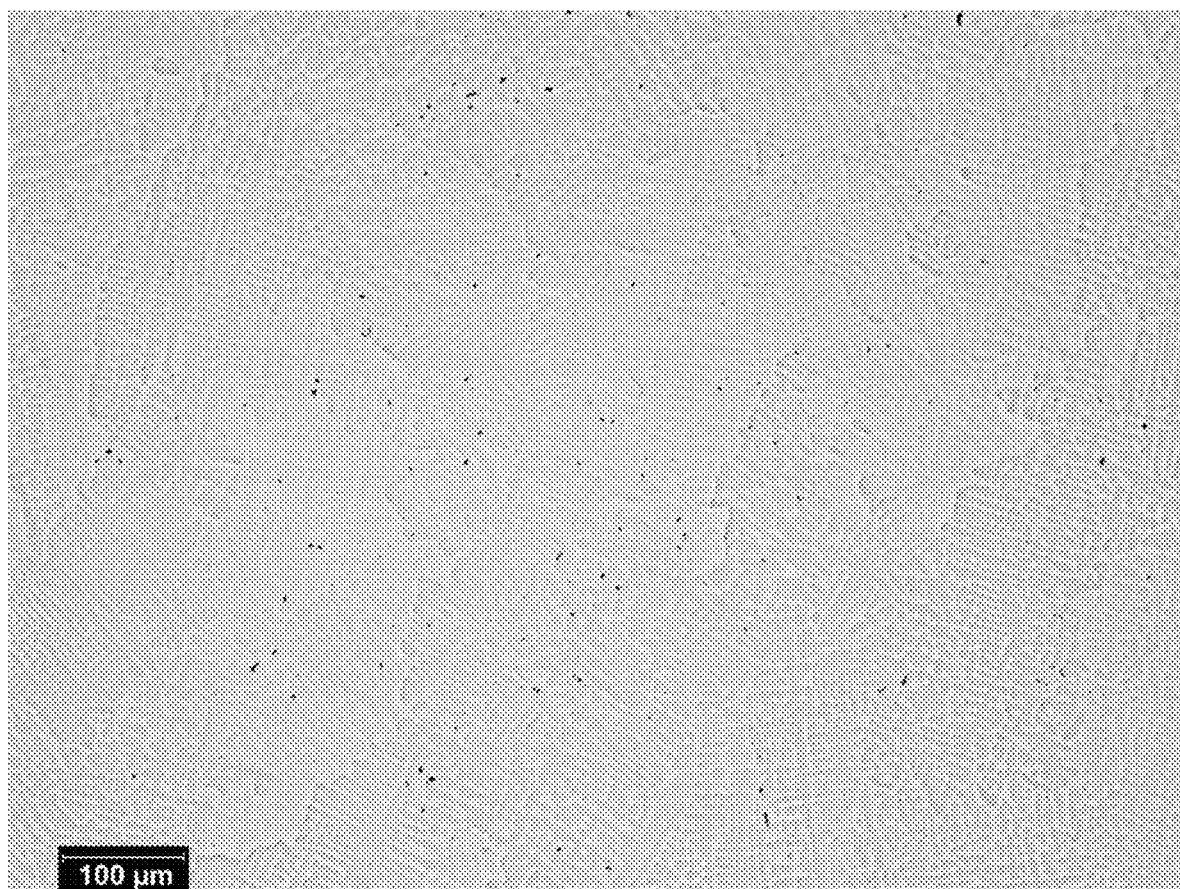

Scanning electron microscopy (SEM) energy dispersive X-ray spectrometry (EDS) was performed on one of the second set of samples, and the average composition of the five-element HEA was (22.6%-26.1%) W, (18.8%-20.6%) Ta, (18.8%-19.3%) Mo, (14.8%-16.0%) Nb, and (19.7%-23.3%) V, where all compositions are atomic percentages. Via SEM analysis, the samples were determined to be single-phase with the expected dendritic microstructure, and the inter-dendrite spacing ranged from approximately 10 μm to approximately 20 μm. FIG. 5 is a cross-sectional micrograph of one of the first set of samples after melting and resolidification. The sample was chemically etched to reveal the internal structure. As shown, some grain structure is visible with internal dendritic structure. The sample was swab-etched (as opposed to being fully immersed) with an etchant prepared from 5 ml lactic acid, 5 ml hydrogen peroxide, 2 ml hydrofluoric acid, and 2 ml nitric acid. FIGS. 6 and 7 are cross-sectional micrographs of one of the second set of samples after melting and resolidification. The sample in FIG. 6 was also chemically etched (with the same etchant detailed above with reference to FIG. 5) to reveal the internal structure, and the sample in FIG. 7 was polished but not chemically etched. The dendritic microstructure of the sample is quite evident.

Finally, multiple Vickers hardness tests using a 1 kg load were performed on the first and second sets of samples, and the results obtained are included in the table below.

| Composition | Hardness (Test 1) | Hardness (Test 2) | Hardness (Test 3) |
|---|---|---|---|
| Nb—Ta—Mo—W | 490 | 533 | 524 |
| V—Nb—Ta—Mo—W | 561 | 579 | 591 |

As expected, the second set of samples exhibits larger hardness values due to the addition of V into the alloy. The hardness values for both sets of samples are fairly high and imply high tensile strength of wires fabricated in accordance with embodiments of the present invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of forming a three-dimensional part comprising a high-entropy alloy or a multi-principal element alloy by additive manufacturing, wherein the high-entropy alloy or multi-principal element alloy comprises four or more metallic elements selected from the group consisting of Nb, Ta, Mo, W, Ti, Hf, V, Zr, Al, and Cr, the method comprising:
   (a) providing a wire consisting essentially of the four or more metallic elements, the wire comprising an assemblage of (i) one or more first metal powders each comprising one or more of the metallic elements, wherein particles of each first metal powder are substantially spherical, and (ii) one or more second metal powders each comprising one or more of the metallic elements, wherein particles of each second metal powder are non-spherical;
   (b) translating a tip of the wire relative to a platform;
   (c) thereduring, melting a tip of the wire with an energy source to form a molten bead comprising the four or more metallic elements, whereby the bead cools to form at least a portion of a layer of a three-dimensional part; and
   (d) repeating steps (b) and (c) one or more times to produce the three-dimensional part,
   wherein the three-dimensional part comprises the high-entropy alloy or the multi-principal element alloy.

2. The method of claim 1, wherein at least one of the first metal powders is an elemental powder consisting essentially of one of the metallic elements.

3. The method of claim 1, wherein at least one of the first metal powders is an alloy powder consisting essentially of two or more of the metallic elements.

4. The method of claim 1, at least one of the second metal powders is an elemental powder consisting essentially of one of the metallic elements.

5. The method of claim 1, wherein at least one of the second metal powders is an alloy powder consisting essentially of two or more of the metallic elements.

6. The method of claim 1, wherein the non-spherical particles of at least one of the second metal powders are angular flakes.

7. The method of claim 1, wherein the wire comprises one or more metallic tubes surrounding the one or more first metal powders and the one or more second metal powders, each metallic tube comprising at least one of the metallic elements.

8. The method of claim 1, wherein an oxygen concentration of the wire is 300 ppm or less.

9. A three-dimensional part fabricated by the method of claim 1.

10. A method of forming a three-dimensional part comprising a high-entropy alloy or a multi-principal element alloy by additive manufacturing, wherein the high-entropy alloy or multi-principal element alloy comprises four or more metallic elements selected from the group consisting of Nb, Ta, Mo, W, Ti, Hf, V, Zr, Al, and Cr, the method comprising:
   (a) providing a wire preform consisting essentially of the four or more metallic elements, the wire preform comprising an assemblage of (i) one or more first metal powders each comprising one or more of the metallic elements, wherein particles of each first metal powder are substantially spherical, and (ii) one or more second metal powders each comprising one or more of the metallic elements, wherein particles of each second metal powder are non-spherical;
   (b) reducing a diameter of the wire preform via one or more mechanical deformation processes, thereby forming a metallic wire;
   (c) translating a tip of the wire relative to a platform;
   (d) thereduring, melting a tip of the wire with an energy source to form a molten bead comprising the four or more metallic elements, whereby the bead cools to form at least a portion of a layer of a three-dimensional part; and
   (e) repeating steps (c) and (d) one or more times to produce the three-dimensional part,
   wherein the three-dimensional part comprises the high-entropy alloy or the multi-principal element alloy.

11. The method of claim 10, wherein at least one of the first metal powders is an elemental powder consisting essentially of one of the metallic elements.

12. The method of claim 10, wherein at least one of the first metal powders is an alloy powder consisting essentially of two or more of the metallic elements.

13. The method of claim 10, at least one of the second metal powders is an elemental powder consisting essentially of one of the metallic elements.

14. The method of claim 10, wherein at least one of the second metal powders is an alloy powder consisting essentially of two or more of the metallic elements.

15. The method of claim 10, wherein the non-spherical particles of at least one of the second metal powders are angular flakes.

16. The method of claim 10, wherein the wire preform comprises one or more metallic tubes surrounding the one or more first metal powders and the one or more second metal powders, each metallic tube comprising at least one of the metallic elements.

17. The method of claim 10, wherein an oxygen concentration of the wire is 300 ppm or less.

18. The method of claim 10, wherein the one or more mechanical deformation processes comprise at least one of drawing, pilgering, swaging, extrusion, or rolling.

19. A three-dimensional part fabricated by the method of claim 10.

20. The method of claim 1, wherein the three-dimensional part consists essentially of four or more metallic elements selected from the group consisting of Nb, Ta, Mo, W, Ti, Hf, V, Zr, Al, and Cr.

* * * * *